INVENTORS
WILBUR J. LEVINE
FRANK P. PALERMO

BY

ATTORNEY

United States Patent Office 3,509,525
Patented Apr. 28, 1970

3,509,525
TRAFFIC PACING SYSTEM
Wilbur J. Levine, Poughkeepsie, and Frank P. Palermo, Chappaqua, N.Y., assignors to International Business Machines Corporation, Armonk, N.Y., a corporation of New York
Filed July 12, 1967, Ser. No. 652,928
Int. Cl. G08g 1/09
U.S. Cl. 340—32   14 Claims

ABSTRACT OF THE DISCLOSURE

A system for allowing vehicular traffic to have its speed regulated by speed monitoring means whereby a minimum amount of stopping of vehicles in a traffic stream will be necessitated. The system includes means located adjacent to a traffic signal for transmitting information relative to the cycle time of said signal and also information enabling an approaching vehicle to determine automatically its distance from said light. Apparatus in the vehicle is adapted to receive information from said transmitting means which is capable of analyzing said information in relation to the current velocity of said vehicle. Said apparatus further includes means for indicating to a driver of said vehicle as to whether said vehicle should maintain its current speed, speed up, or slow down in order to reach the traffic signal during a green cycle and otherwise help maintain optimum traffic flow.

BACKGROUND OF INVENTION

The present invention relates to the area of traffic control. More particularly, it relates to a system for indicating to the driver of a moving vehicle an optimum speed whereby the vehicle will reach a controlled intersection during the green cycle of the controlling traffic signal.

Current trends in today's traffic picture, including both greater numbers of vehicles on the highways, together with the increased speed capabilities of the vehicles, make necessary continued research into methods and apparatus for improving traffic flow and thus hopefully reducing congestion and traffic accidents. One of the major problems or bottlenecks in any highway system is that of the simple controlled intersection wherein traffic approaching the intersection from one direction must stop while traffic approaching from the other direction passes through under control of an appropriate signal. Extensive efforts have in the past been devoted to elaborate systems for monitoring traffic flow along the highways approaching an intersection complex and controlling the cycling of one or more lights along said intersection in order that traffic may flow in an optimum fashion, i.e., with the fewest number of complete stops for vehicles in the traffic streams.

Most of these prior art systems have approached the problem of traffic control by counting numbers of vehicles on a highway together with the speed of movement of the vehicles. With this information, an input is developed for a traffic signal control system and traffic signals such as lights are controlled by this input in accordance with a predetermined algorithm.

It is desirable to control traffic signals to avoid the stopping of vehicles because once a traffic stream has stopped the inertia of such a stream, especially during rush hours or other times of heavy traffic, is extremely great. For example, a single stop in a heavy stream can cause a traffic jam which will cause a back up of many blocks or even miles. Accordingly, the objectives of most traffic control systems through conventional signal controlled intersections is to allow all vehicles approaching the intersection to pass through said intersection during the green phase without stopping. Closely related to this is the concept of alternatively platooning or grouping vehicles approaching an intersection from opposing directions, such that one platoon can pass through during the vacant or no vehicle portion of the opposing traffic stream and vice versa.

The above criteria should be met by any effective traffic control system on existing streets and highways utilizing relatively conventional traffic signals. But even more significant is the fact that such criteria, would of necessity, be built-in features of any automated highway system of the future wherein the speed of vehicles using such an automated highway would be assumed to be under the control of the highway system.

While, as stated previously, a great deal of research and effort has been directed to traffic control systems wherein traffic streams are merely monitored and traffic signals controlled in accordance with information gathered from said monitoring, it is not believed that any significant efforts have been directed towards a system directed primarily at controlling the operation of vehicles in such traffic streams under the control of the individual drivers.

SUMMARY OF THE INVENTION AND OBJECTS

The present invention accomplishes improved traffic control by properly pacing or controlling the speed of vehicles approaching an intersection having a traffic signal or other similar traffic control means. This is achieved by providing a transmitter adjacent to such a traffic control signal which provides information to an approaching vehicle relative to the inherent signal cycle of the traffic control means and also provides information whereby a vehicle may automatically determine its distance from said signal. Receiving and logic apparatus is provided for each vehicle capable of receiving the information from said transmitter which apparatus provides information to the driver relative to the speed he should be travelling in order to reach said intersection during a green phase.

It is accordingly a primary object of the present invention to provide an improved traffic control system whereby individual vehicles rather than a controlling signal are affected by the system.

It is yet another object of the invention to provide such a traffic control system providing improved traffic flow approaching a controlled intersection.

It is yet another object of the invention to provide such a traffic control system wherein a speed indication is provided for a vehicle operator indicative of the optimum speed at which said vehicle should be travelling.

The foregoing and other objects, features and advantages of the invention will be apparent from the following more particular description of preferred embodiments of the invention, as illustrated in the accompanying drawings.

DESCRIPTION OF DRAWINGS

FIG. 3 is an organizational diagram of FIGS. 3A and B.

DESCRIPTION OF THE DISCLOSED EMBODIMENTS

The objects of the present invention are accomplished in general by a traffic pacing system comprising a transmitting station associated with a traffic contrlo means having green and non-green control phases. The transmitting station includes means associated therewith for providing an indication to an approaching vehicle of its distance from said station. Additional means are provided for transmitting signals indicative of the time to the end of the closest green phase, the total period of the green phase, and the total green and non-green cycle period for said traffic control means. A receiver means is provided for mounting on a vehicle which includes means for receiving the signals from said transmitting means and means for determining the distance of the vehicle from said transmitting means. Said receiver means further includes means for determining when said vehicle will reach said traffic control means based on its current velocity and means operative in response to said last named means to indicate an optimum velocity for said vehicle relative to the current velocity thereof which will allow the vehicle to reach the traffic control means during a green phase.

According to the disclosed embodiments, a signal is produced by the logic circuitry associated with the receiver means mounted on the vehicle, said signal indicating whether the vehicle should maintain its current speed, speed up or slow down. This signal may be used to indicate to the driver by appropriate indicator lights, as in the disclosed embodiments, what the relative velocity of the vehicle should be. Alternatively, the signal might be utilized to control automatic speed regulating equipment if this system were to be part of an automated highway system. The presently disclosed system thus attempts to achieve traffic control by controlling the actual speed of vehicles in a traffic stream approaching a controlled intersection rather than merely monitoring said stream and attempting to control signals in accordance therewith. As will be apparent from the subsequent description, the indicated speed or velocity at which these vehicles should be travelling to reach the intersection at a desired time will be given in the form of appropriate signal lights on the dashboard of the vehicle.

Stated very briefly, the manner in which this indication is achieved is as follows: The transmitting station located adjacent to the travel control means provides a signal set whereby the vehicle's time of arrival at the intersection may be computed relative to the timing cycle of said traffic control means. Thus, the transmitting station must provide data to the vehicle and to the receiver logic circuitry means therein enabling the vehicle to compute its distance from the intersection and also compute the time of arrival of the vehicle based on its then current velocity. If the computed time of arrival at the current speed falls within a green phase of the traffic control means, the system will indicate that the vehicle should "maintain" its current speed. If however the computed time of arrival falls within a non-green. or red phase, the vehicle will be told to "speed up" or "slow down" depending upon whether the estimated time of arrival falls before the midpoint of the non-green phase or after the midpoint of the non-green phase.

The transmitting station provides certain information to the receiver in the vehicle and this latter receiver then decodes and processes this information to provide the above noted result.

Having thus generally described the operational features and advantages of the present traffic pacing system, the invention will now be described in more detail with reference to the disclosed embodiments.

Figure 1:
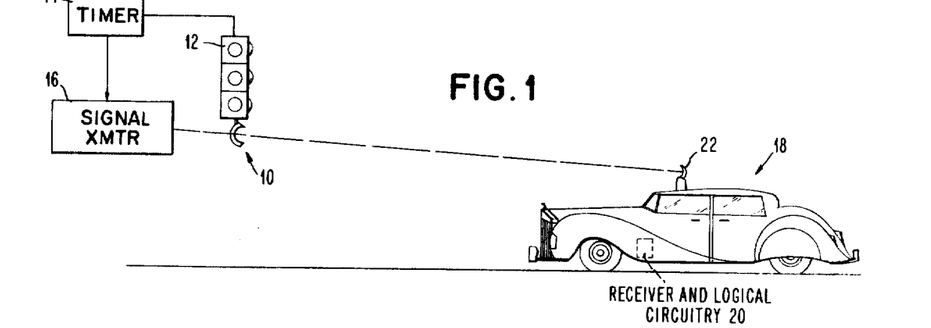
FIG. 1 is an environmental diagram of the present system generally illustrating the major functional components thereof.

FIG. 1, which is a very general environmental diagram of the present system, sets forth the primary functional components of a preferred embodiment of the present invention. The transmitting station generally referred to by the numeral 10 comprises a traffic control signal 12, a timer 14 and a signal transmitter 16 which will be described in more detail with respect to FIGS. 2A and 2B. In essence, the timer and signal transmitter provide signals to be transmitted to the vehicle from which a determination of vehicle distance from the intersection, legal speed limit in the vicinity of the traffic control means, and various other information relative to the cycling of the traffic control means 12. A vehicle is shown diagrammatically at 18 which has a Receiver and Logic Circuitry block located therein. Antenna means 22 is shown on the top of the vehicle for receiving signals transmitted from the signal transmitter 16.

Before proceeding further with the detailed description of the Transmitting Station 10 or the Receiver and Logic Circuitry a general description of the method of distance computation from the transmitting station will follow. This is accomplished in the disclosed embodiments by utilizing an RF and an associated supersonic pulse which pulses are transmitted concurrently by the transmitting station. Since the speed of the electromagnetic radiation is infinite (186,000 miles per second) compared to the speed of a sound wave (1100 feet per second) the RF signal is used to start a ramp generator in the receiver and at the time the audio frequency pulse is received, this ramp is stopped and the voltage sampled. Thus the magnitude of the sampled voltage may be utilized as a direct indication of the distance of the vehicle from the transmitting station. A more complete description of the particular ramp generator will be set forth relative to the descriptoin of FIG. 4. By this means a very close approximation or distance measuring system is rendered possible. Based on the distance of the vehicle from the transmitting station and the vehicle's actual velocity the estimated time of arrival $T_A$ for the vehicle at the traffic control means may be readily determined. As will be apparent subsequently, this figure, i.e., $T_A$, is critical in the control logic.

Figure 2A:
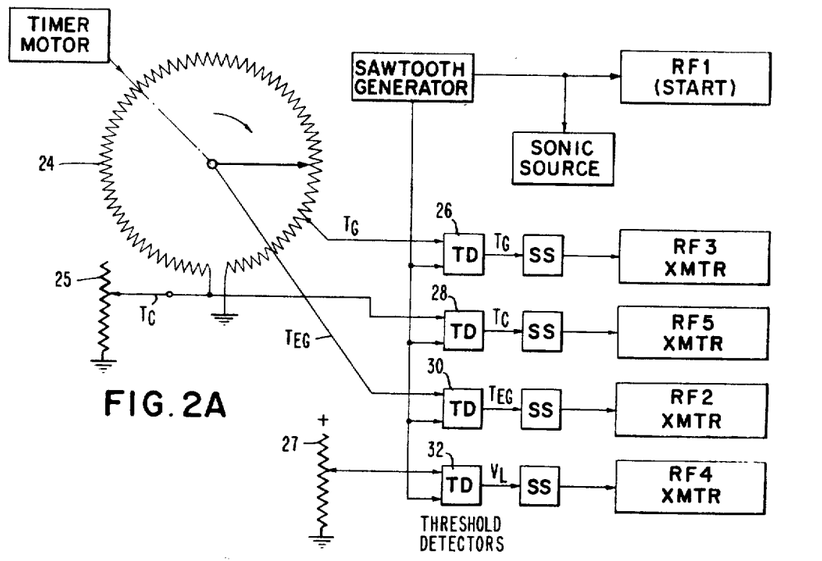
FIG. 2A is a functional block diagram of a transmitting station associated with a traffic control means

Referring to FIG. 2A a transmitting station constructed in accordance with the principles of the present invention is disclosed. Generally the station comprises as its basic elements a motor driven potentiometer 24, a Sawtooth Generator, a series of Threshold Detectors and RF transmitters. It is the function of this unit to produce the various RF pulses and the sonic pulse S.S. from which the various determinations are made by the Receiver located in the approaching vehicle. It will be noted that the potentiometer 24 has its contactor driven by a Timing Motor which is synchronized with the Traffic Control Motor which is synchronized with the Traffic Control means and which makes a complete revolution for each complete cycle of said traffic control means. The Sawtooth Generator repetition rate determines the number of cycles or periods of a transmitting cycle. The relative timing of the Sawtooth Generator need have no bearing on the signal cycle. The important thing is that on its initiation, the start signal from RF-1 and also the sonic signal from the Sonic Source are sent out. As the Sawtooth Generator voltage builds certain coincidences are detected by the Threshold Detectors 26–32. One of the inputs to each of these means is the output of the Sawtooth Generator. The other inputs are taken from the potentiometer 24 or the fixed potentiometer 25. It will be noted that the second input to the Threshold Detector 32 is taken from the potentiometer 27 which gives a figure for the legal speed limit $V_L$. The following Table I indicates the meaning of the various timing symbols on the FIG. 2A.

TABLE I $T_C$=Cycle Duration (constant)
$T_G$=Duration of Green (constant)
$T_{EG}$=Time until end of green signal (variable)
$V_L$=Speed Limit (constant)
Range=Distance from signal (variable)

Figure 2B:
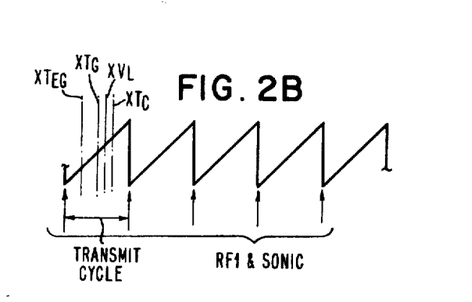
FIG. 2B is a graphical representation of the timing cycle of the transmitting station of FIG. 2A.

It will be obvious to one skilled in the art that as a coincidence is detected by the Threshold Detectors, an output pulse will occur which is then sent to an appropriate single shot multivibrator which in turn pulses the respective RF transmitters designated RF–2 through RF–5. FIG. 2B which is a graphical representation of the output of the Sawtooth Generator indicates in the first cycle the occurrence of the various events relative to the output of said Sawtooth Generator. It should be noted that the various timing pulses or voltages developed, i.e., $T_{EG}$, $T_G$ and $T_C$ must be to the same scale, however the point indicated by $V_L$ which is a quantity relating to the legal speed limit at the intersection need only be relatable to the analog voltage developed at the receiver for the vehicle speed $V_A$ which is obtained from the vehicle speedometer as will be described subsequently. An alternative graphical illustration of the timing sequences of the Transmitting Station is shown in FIG. 5B wherein the actual relative times of the pulses sent out by the Transmitting Station and received by the Receiver located in the approaching vehicle are clearly shown. It should be noted that all of these outputs are essentially constants except the pulse representing the time to the end of the green signal $XT_{EG}$. Referring to FIG. 2A it will be noted that this voltage will vary depending on the position of the wiper contact on the variable potentiometer 24 and will of course vary with respect to the time of a transmitting cycle relative to a traffic control means cycle. It should additionally be noted that each of the RF transmitters RF–1 through RF–5 produces a signal of a different frequency which signal may readily be distinguished by a similar plurality of five separate RF receivers located in the vehicle receiver tuned to a respective transmitter frequency. It will thus be seen that the various parameters necessary for the vehicle receiver to make the required calculations relative to optimum vehicle speed may be determined from the time displaced pulses S.S., and RF–1 through RF–5.

Figures 3, 3B:
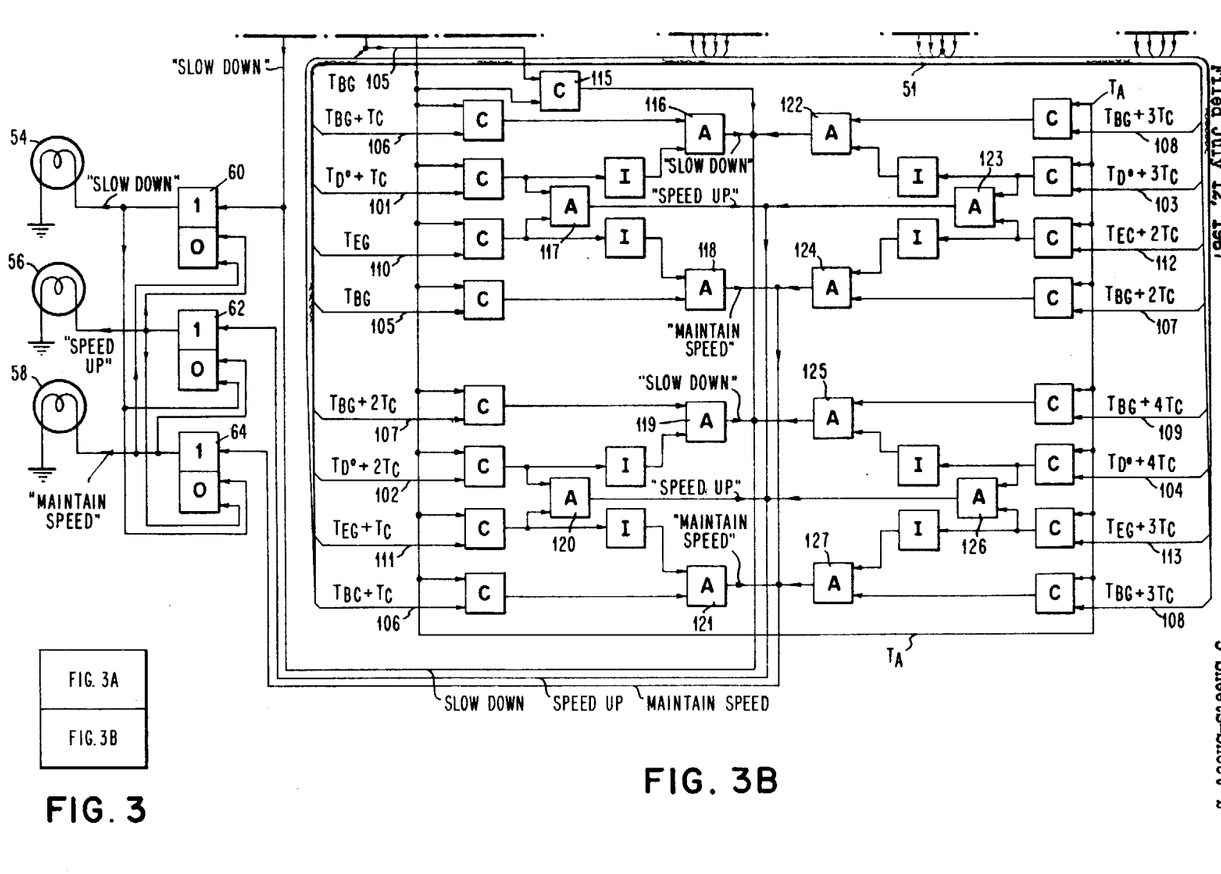

Referring now to FIG. 3 the utilization of the pulses transmitted by the Transmitting Station by the vehicle Receiver and Logic Circuitry shown on FIG. 3 will be set forth. To the left of this figure the various boxes 50 which are in effect analog counters are shown. The details of this counter will be set forth in the description of FIG. 4. It will be noted that each of the counters has two inputs, one of these being the reference or start input RF–1. The other inputs are respectively from the Sonic Source (S.S.) and from the transmitters RF–2 through RF–5. The purpose of these analog counters or interface units is to provide analog voltages proportional to the quantities, i.e. time displacement being measured. Thus the output of the counters indicated as $T_{EG}$, $-T_G$ and $4T_C$ produce output voltage proportional to time. The output of the block marked RANGE is an analog voltage representing distance and the output of the box marked $V_L$ is indicative of velocity or feet per second (legal). The output of the box marked $V_A$, which is not an analog counter, is taken from a voltage source connected to a potentiometer having its movable contact connected to the speedometer and which provides an analog voltage to the same scale as the output of the box marked $V_L$. The signal $V_A$ indicates the actual speed or velocity of the vehicle and in turn is compared with $V_L$ in the box 128.

Figure 4:
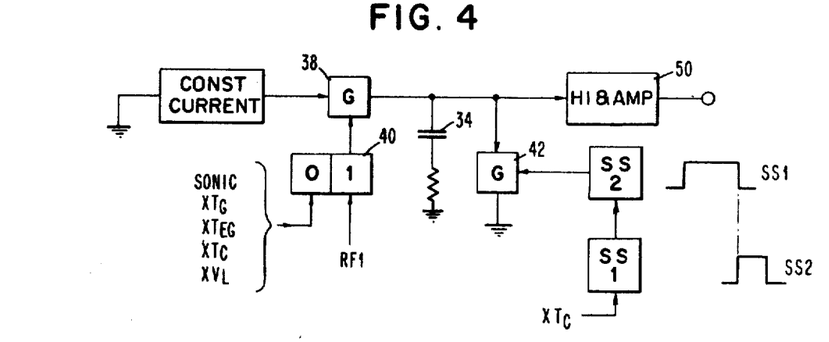
FIG. 4 is a logical schematic diagram of an analog function generator for use in the receivers of FIGS. 3 and 6.

Before proceeding with the description of the embodiment as set forth in FIG. 3, the actual contents of an analog counter will be described with reference to FIG. 4. This basic counter for all functions is an integrator comprising a Constant Current Source, a Capacitor 34 and an Associated Resistor 36. The charge or voltage on this Capacitor 34 is a linear function of time. All of the Capacitors 34 start charging when their respective gates 38 are enabled by the flip-flops 40 being set to their "1" state by receipt of the start pulse RF–1. The capacitors stop charging when the flip-flops 40 are reset to a "0" by receipt of the respective disabling inputs indicated by the bracket, i.e., Sonic, (S.S.) $XT_G$, $XT_{EG}$, $XT_C$, and $XV_L$. The X indicates the pulse as distinguished from the analog signal. The charging times and charging rates are preferably selected such that the terminal voltages are proportional to the phenomenon to be measured. For example if the range or distance is 4400 feet, the charging time for the range capacitor might be four seconds (speed of sound=1100 feet/sec.). In four seconds the range capacitor should accumulate a voltage of 44 volts. Thus if the speed limit is 30 m.p.h. (44 ft./sec.) then the time to reach the intersection would be 100 seconds. The $V_L$ Capacitor 34 should have a charge of .44 volt. This charge can be accumulated in 30 milliseconds by choice of the charging current and other circuit parameters, such as the resistor 36. The use of the high impedance amplifier (HiZAmp) permits utilizing the capacitor voltage without discharging same. Obviously, other scale factors and voltage ranges can be chosen and the result of the computation (division) appropriately scaled by persons skilled in the art. The purpose of the gate circuit 42 and the two single shots S.S.–1 and S.S.–2 are to appropriately discharge the capacitor 34 upon termination of a measuring cycle. S.S.–1 is enabled by the received pulse $XT_C$ and S.S.–1 provides a short time delay to allow the analog counter which develops the voltage $T_C$ to fully charge its capacitor 34 before enabling single shot S.S.–2 which in turn shorts the capacitor 34 to ground to discharge same. The relative time duration and occurrence of the two single shot pulses is also shown on FIG. 5B wherein it will be noted that S.S.–1 initiates upon the receipt of the pulse $XT_C$ and that the pulse S.S.–2 initiates upon the termination or turn off of S.S.–1.

Returning again to FIG. 3 the operation of this preferred embodiment of the invention will be explained in detail. This embodiment gives the driver of the approaching vehicle the descretion of picking a speed of less than the speed limit and guides him to make that light which he can achieve with minimum speed adjustment. This is accomplished by computing a factor $T_D$ which is a time factor indicating the time from the instant time ($T_0$) to the midpoints of each of the nongreen portions of the various light cycles ($T_D o$, $T_D'$, $T_D''$, $T_D'''$, etc.). The derivation of the location of the point $T_D o$ is shown in the following Table II. The derivation of $T_A$ and also $T_{BG}$ is indicated in this table.

TABLE II $$T_{D^o} = \frac{(T_{EG} - T_C) + (T_{EG} - T_G)}{2}$$

$$T_{D^o} = T_{EG} - \frac{T_C}{2} - \frac{T_G}{2}$$

$$T_A = \frac{\text{Range (ft.)}}{V_A \text{ (ft./sec.)}} \text{ (time to intersection travelling at instant actual speed)}$$

$T_{BG} = T_{EG} - T_G$ (negative if signal is currently green)

Figure 5A:
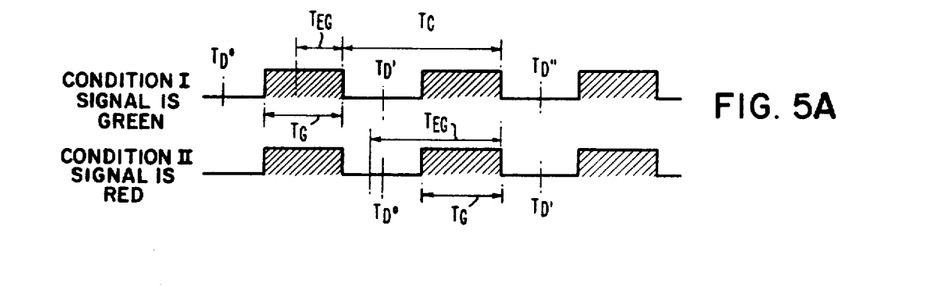
FIG. 5A is a graphical representation of the traffic control signal timing cycle together with an indication of time periods which are critical to the present traffic control system.
Figure 5B:
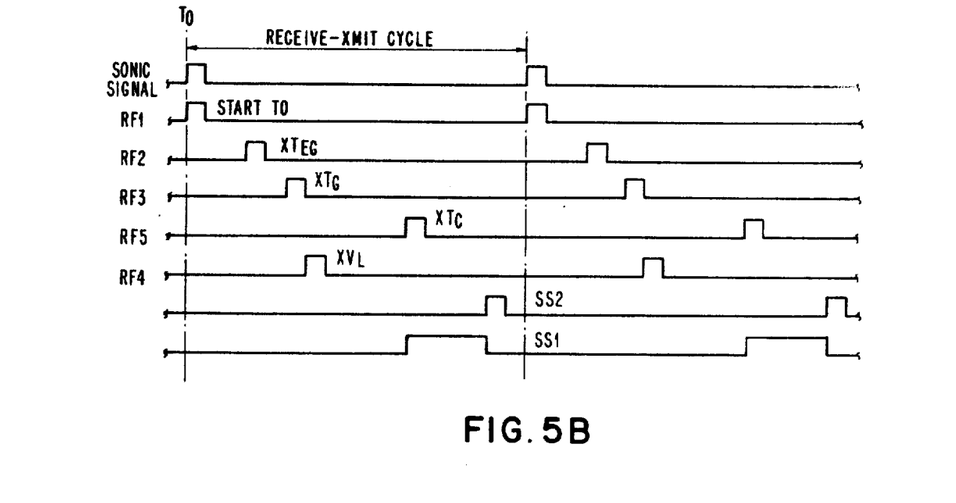
FIG. 5B is a timing chart for certain events occurring at both the transmitting and receiving stations.

Reference should now be made to FIG. 5A which shows graphically the various scalar quantities referred to in Table I and Table II. The hatched portions of the waveforms indicate the green cycle of the traffic control means or signal.

It will be noted that FIG. 5A indicates two possible conditions or locations of $T_0$. The first or Condition I is where the light is currently green at the time of receipt of the various signals while Condition II is where the light is non-green or red at the time of receipt of the signals. Stated briefly for Condition I, if the time of arrival $T_A$ is computed to fall before $T_{EG}$ then this means that the driver should "maintain" his current speed. Secondly, if the time of arrival falls between the $T_{EG}$ and the point $T_D'$ i.e., the midpoint of the next non-green cycle, then the driver is signaled to "speed up" in order to make the then current green cycle. Thirdly, if $T_A$ is computed to fall between the point $T_D'$ and the next $T_{BG}$ the driver is instructed to "slow down" so that he will arrive at the traffic signal during the next green cycle. For Condition II if $T_A$ is computed and found to be before $T_{BG}$ of the next green cycle, the driver is told to "slow down." If the $T_A$ is computed to lie between $T_{BG}$ and $T_{EG}$ the driver is told to "maintain speed," and finally, if $T_A$ is found to lie between the point $T_{EG}$ and $T_D'$ the driver is told to "speed up." As stated previously the quantity $T_D o$ is computed as indicated in Table II and quantities $T_D'$, $T_D''$, $T_D'''$, etc., are obtained by adding $T_C$, $2T_C$, $3T_C$, etc. to the quantity $T_D o$. These quantities are indicated in Tables IV and V. It should also be noted that if the traffic control means is currently green, the quantity $T_D o$ will invariably be negative (see Table II) since it occurs in the middle of the non-green phase preceding the current green phase. If the light is currently red, $T_D o$ may be either positive, negative or zero depending on the relationship between $T_o$ and $T_D o$. This initial location of $T_D o$-makes the speed up and slow down logic for all light intervals comparable and independent of the state of the light. If the light is presently red, no amount of speeding could make the vehicle arrive during the green phase which has passed as opposed to Condition I. Thus, it will be seen that for condition I and for Condition II, the polarity of $T_D o$ may change. However, the various formulas set forth and the logic circuitry take care of the situation automatically and the formulas given are accurate for either condition.

Figure 3A:
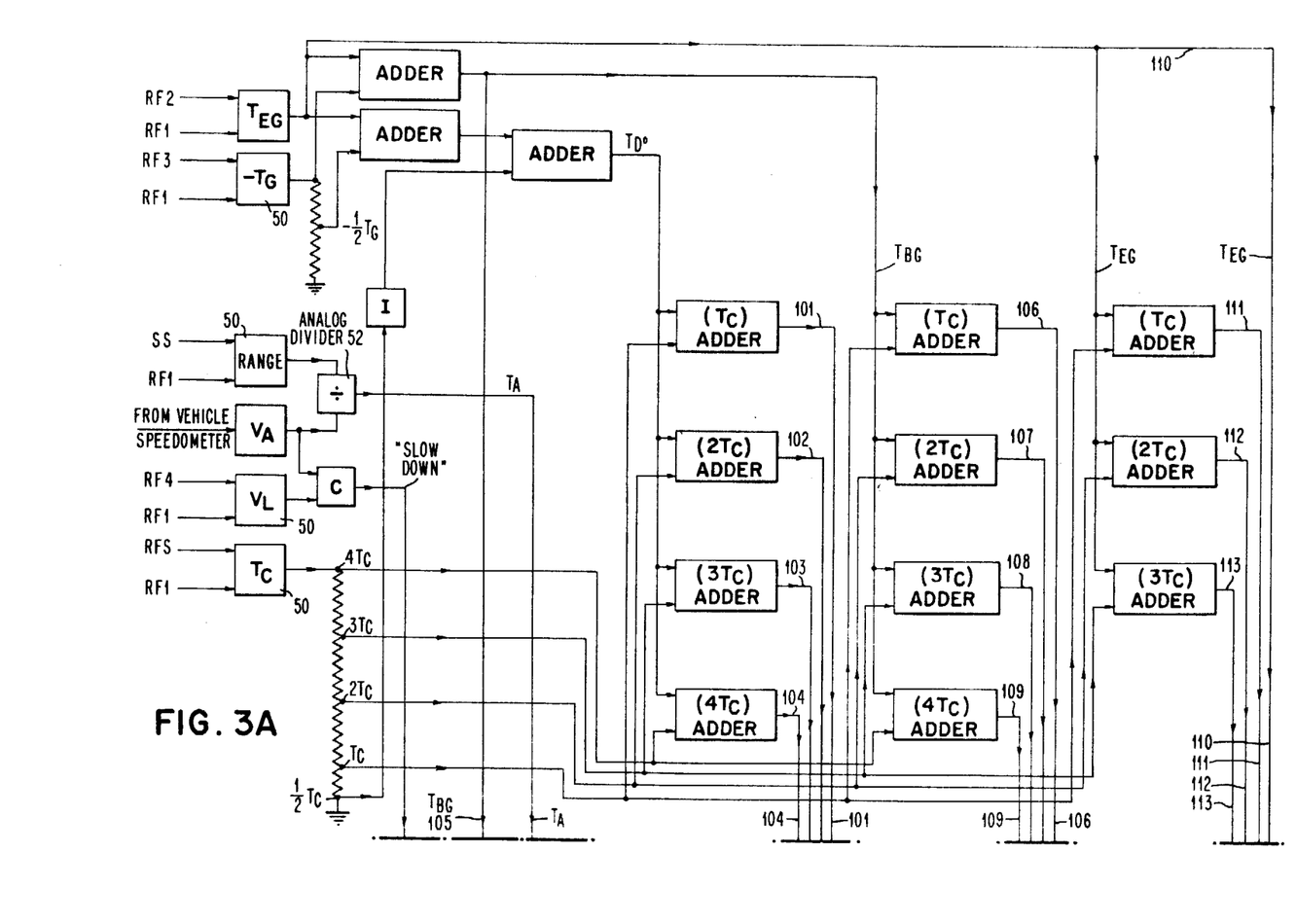
FIGS. 3A and B comprise a combination functional block diagram and logical schematic of a preferred embodiment of a receiving station including logic circuitry.

Referring now to the upper portion of the composite of FIGS. 3A and 3B, the series of adders shown produces the following outputs:

| | | |
|---|---|---|
| $T_D o + T_C$ | $T_{BG}$ | $T_{EG}$ |
| $T_D o + 2T_C$ | $T_{BG} + T_C$ | $T_{EG} + T_C$ |
| $T_D o + 3T_C$ | $T_{BG} + 2T_C$ | $T_{EG} + 2T_C$ |
| $T_D o + 4T_C$ | $T_{BG} + 2T_C$ | $T_{EG} + 3T_C$ |
| | $T_{BG} + 4T_C$ | $T_{EG} + 4T_C$ |

These adders will not be further described since their inputs and outputs are clearly labelled. It should be noted that the inputs to these adders come from the analog counters 50 and the block marked $V_A$. Noting the output of the analog counter 50 labelled $4T_C$, a 5 tap potentiometer is located in its output and its total output is scaled to be $4T_C$ as indicated and the various other outputs, i.e. $3T_C$, $2T_C$, $T_C$, and $½T_C$ are appropriately tapped off. It being additionally noted that the $½T_C$ is passed through an inverter to change its polarity for final summation to form the quantity $T_D o$ as required by the formula in Table II. An additional potentiometer is located in the output of the analog counter labelled $-T_G$ to produce the quantity $-½T_G$ which as indicated previously is utilized in arriving at the quantity $T_D o$. The output of the analog counter $-T_G$ is of negative polarity since this factor is always subtracted and when it it appears as a negative quanity may be simply added in a standard algebraic adder.

The output lines from these function generators or adders are numbered 101–113 and enter the cable 50 and are ultimately routed to their desired logic designations in the logic circuitry. This logic circuitry appears physically on the drawing within the cable 51. This logic consists of a series of comparators (C), and ingates and inverters. Their inputs come from the adders over lines 101–113 as clearly marked and also from the Analog Divider 52 which provides the function $T_A$ or the time of arrival of the vehicle. The Comparators (C) produce an output only if the top input to the comparator box exceeds the magnitude of the lower input. Thus, Comparator 115 will have an output only when $T_{BG}$ exceeds $T_A$.

It will be noted that all of the outputs from the various gates 116 through 127 in the Logic Circuitry section are ultimately combined on one of the three lines which pass to the indicator light circuitry for the lights 54, 56, 58. These lights when illuminated indicate to the driver that he should "slow down," "speed up" or "maintain speed" respectively. The lights are controlled by the flip-flops 60, 62 and 64. It will be noted that when any one of these flip-flops is set to its "1" state, it automatically resets any other flip-flop that was previously in a "1" to a "0." The only input to these flip-flops not taken from the Logic Circuitry is the direct input to the flip-flop 60 which comes from the Comparator 128. As stated previously, when this Comparator has an output, the vehicle's current velocity $V_A$ is exceeding the speed limit $V_L$ which automatically requires a slow down signal and automatically overrides any other indication.

The operation of the Logic Circuitry will now be explained with the help of Tables III, IV and V. These tables are in essence logical equations for the various logical components wherein the greater than less than function is accomplished in the Comparators and the (+) is accomplished in the various AND gates. It will also be noted that a number of condition inversions are accomplished in the various Inverter boxes (I). It is believed that the operation of all of these components is well known to one skilled in the art and need not be explained in detail. Since there can be only one time of arrival $T_A$ for any one cycle, this time of arrival can only fall into one unique time interval in the overall traffic control means cycle. The Logic Circuitry determines whether the driver should go for the first, second, third, or fourth green light of a particular series depending on his speed and distance from the light. Based on this determination it then determines and advises him how to adjust his speed "to make" the light automatically selected. Assuming the driver starts his speed adjustment while he is perhaps ½ mile from the light, he will have ample opportunity to make the necessary speed adjustment. Once he achieves the "maintain speed" signal he can be confident that if he holds the speed, he will pass through the light on the green cycle.

If the computation calls for a "speed up" in excess of the speed limit the driver will be signalled to slow down automatically as he exceeds the speed limit. As the light advances in its cycle and the driver lessens the distance to the intersection, the cycle will precess with respect to $T_A$ and the driver will receive a "slow down" signal to go for the next green light following the one that he could not make except by over speeding.

Table III below indicates those situations where, if satisfied, the current time of arrival $T_A$ will fall within a current or ensuing green cycle. Referring to this table, the numbers in parenthesis by each logical equation indicates the particular AND gate in the Logic Circuitry which is enabled by a successful meeting of the conditions stated. The inputs to the particular AND gates may be readily determined from both the logical equations and the drawings.

TABLE III

"Maintain Speed"

$T_{BG} < T_A < T_{EG}$ (118)
$T_{BG} + T_C < T_A < T_{EG} + T_C$ (121)
$T_{BG} + 2T_C < T_A < T_{EG} + 2T_C$ (124)
$T_{BG} + 3T_C < T_A < T_{EG} + 3T_C$ (127)

Thus from the above table, it will be seen that when an output from any one of the AND gates 118, 121, 124 or 127 occurs, it will cause the line to flip-flop 64 to be activated and thus activate the indicator light 58 which indicates that the driver should "maintain speed."

Table IV below indicates those situations for which the driver should slow down in order to make an ensuing green phase of the traffic control means.

TABLE IV

"Slow Down"

$V_A > V_L$ (speed violation) (128)
$T_A < T_{BG}$ (if light is red) (115)
$T_D o + T_C < T_A < T_{BG} + T_C$ (116)
$T_D o + 2T_C < T_A < T_{BG} + 2T_C$ (119)
$T_D o + 3T_C < T_A < T_{BG} + 3T_C$ (122)
$T_D o + 4T_C < T_A < T_{BG} + 4T_C$ (125)

As stated previously, it will be remembered that this is the situation when the time of arrival falls at a point in the non-green or red phase between the midpoint thereof ($T_D$) and the beginning of the next green cycle ($T_{BG}$). This table is organized like Table III above wherein the number in parenthesis following each logical equation refers to that element having an output when its particular logical equation is satisfied. Thus, if any of the devices 128, (Comparator) 115, 116, 119, 122, or 125 becomes active, the input setting flip-flop 60 to a "1" becomes active thus causing the indicator light 54 to be illuminated which indicates to the driver that he should "slow down."

Table V again is similar to Table III and Table IV and shows those logical equations which when satisfied indicate that the driver should "speed up" to make a particular green phase of the signal light.

TABLE V

"Speed Up"

$T_{EG} < T_A < T_D o + T_C$ (117)
$T_{EG} + T_C < T_A < T_D o + 2T_C$ (120)
$T_{EG} + 2T_C < T_A < T_D o + T_C$ (123)
$T_{EG} + 3T_C < T_A < T_D o + 4T_C$ (126)

As will be remembered, this situation occurs when the time of arrival falls between the end of a particular green cycle ($T_{EG}$) and the midpoint of the next non-green cycle ($T_D$). This table again is arranged like Table III and IV wherein the numeral in parenthesis following each logical equation indicates that logical element which becomes active when a particular equation is satisfied by its input circuitry. From the above table it will be seen that when any of the devices 117, 120, 123 or 126 becomes active, the line setting flip-flop 62 to a "1" will be activated, thus, illuminating light 56. The illumination of this light indicates to the vehicle driver that he should "speed up."

It is believed that the above tables, including the logical equations, clearly indicate the situations wherein the various control lamps will be illuminated to control the speed. It being noted generally that the various sub tests in each group seek to satisfy the situation wherein the time of arrival $T_A$ falls in a subsequent light cycle. As will be seen from these formulas and from the previous explanation, a subsequent light cycle tested for is achieved by merely adding a total light period $T_C$ to the particular function being looked at.

Figure 6:
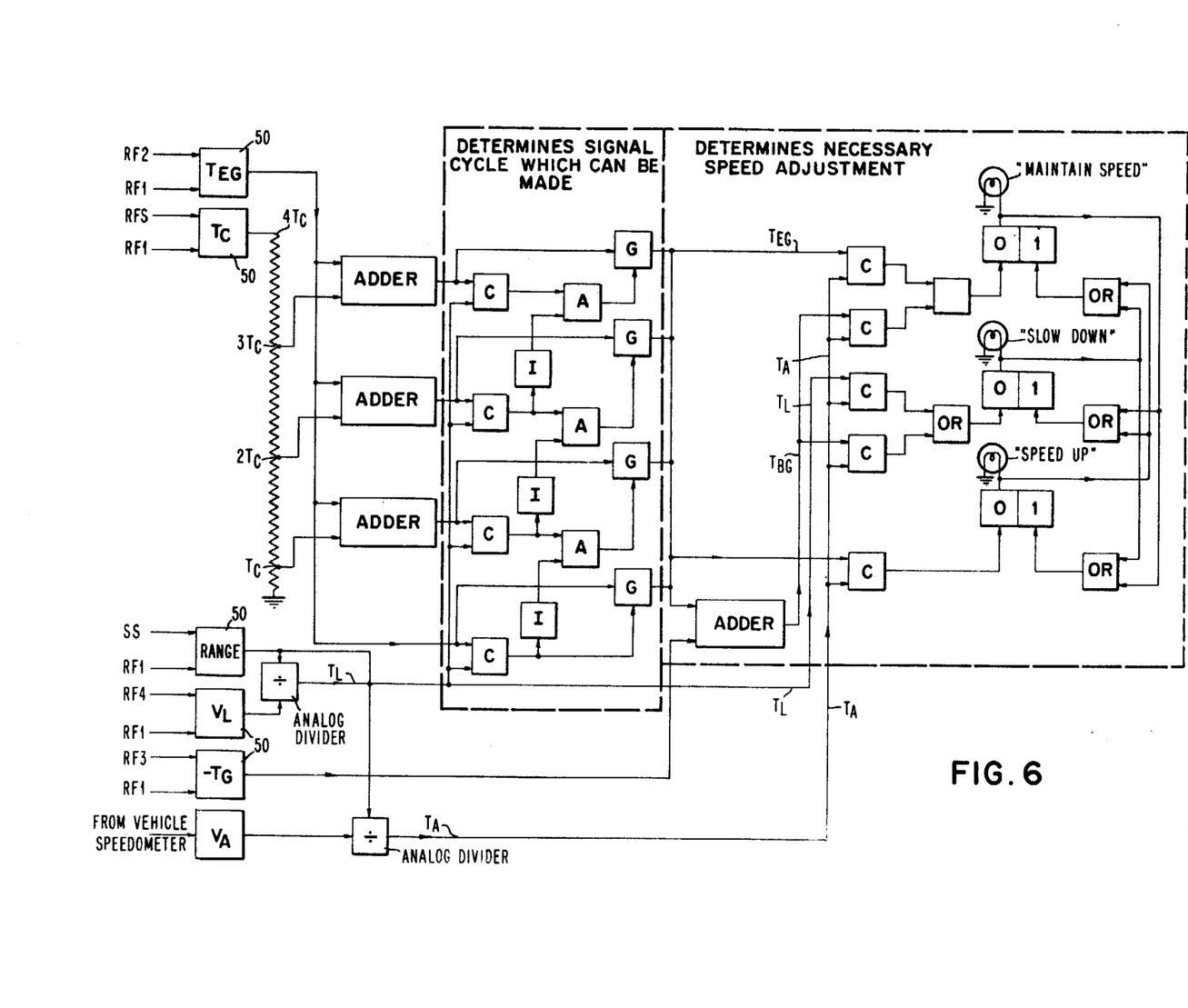
FIG. 6 is a combination functional block diagram and logical schematic of an alternative embodiment of the present invention.

An alternative embodiment of the present invention is shown in FIG. 6. This embodiment does not achieve quite the fine control of the embodiment of FIG. 3 although it does require considerably fewer components. The various elements of the drawing are shown in the same detail as in FIG. 1. Thus for example, the inputs to the analog counters 50 are the same as for the embodiment of FIG. 3.

This embodiment seeks to form all vehicles in a traffic stream into spaced platoons travelling at the speed limit so that each platoon will pass the intersection on the green. This is achieved by computing which light can be made by travelling at no more than the speed limit. It compares the computed $T_A$ with the functions $T_{EG}$; $(T_{EG} + T_C)$; $(T_{EG} + 2T_C)$; and $(T_{EG} + 3T_C)$ and signals the first (lowest) to compare as the selected light for that particular vehicle. The arrival time $T_A$ is then compared with $T_{EG}$ and $T_{BG}$ for that selected light cycle. If $T_A$ lies between these points, the "maintain speed" signal is lighted. If $T_A$ is greater than $T_{EG}$ the "speed up" signal will be lit. In this latter instance the driver must be going less than the speed limit since the circuit has previously determined that the selected light can be "made" at the speed limit. If $T_A$ is less than $T_{BG}$ then the "slow down" signal is given.

The transmitted information signals for the second embodiment of FIG. 6 are the same as that for FIG. 3. The only additional function is $T_L$ which is expressed as $$T_L = \frac{R}{V_L}$$

which equals minimum time to intersection travelling at speed limit. This function is clearly indicated on FIG. 6 as the output of the analog divider which has inputs from the two analog counters labelled Range and Speed Limit.

The Logic Circuitry for determining "which light" is indicated to the left of the drawing between the dotted lines and this section "Determines Which Light Can Be Made." The logical equations tested for by this circuitry are shown in Table VI.

TABLE VI

"Which Signal Cycle"

(1) $T_L < T_{EG}$
(2) $T_L < (T_{EG} + T_C)$
(3) $T_L < (T_{EG} + 2T_C)$
(4) $T_L < (T_{EG} + 3T_C)$ Select First Equation Satisfied From the above table one of the four output gates indicated will be activated and the information therefrom passed into that portion of the Logic Circuitry which determines the speed indication to the driver. This portion of the circuitry is indicated by the dotted lines and the legend "Determine Necessary Speed Adjustment." The logic for this circuitry is shown in the logical equation of Table VII. This table is believed to be self explanatory wherein a successful satisfaction of any of these four equations will result in the control indication noted. It should also be noted in this table that the factors $T_{EG}$ and $T_{BG}$ may reflect the addition of one or more multiples of the quantity $T_C$ depending upon which green light cycle was detected by the "Determine Which Light Can be Made" circuitry. The operation of the functional components of FIG. 6 is the same as those of FIG. 3. The operation of all of these components has been previously described with reference to FIG. 3 and is accordingly not repeated.

TABLE VII

"For Selected Signal Cycle"

$T_{EG} > T_A > T_{BG}$ "Maintain Speed"
$T_L > T_A$
   "Slow Down"
$T_{BG} > T_A$
$T_A > T_{EG}$ "Speed Up"

Both the embodiments of FIGS. 3 and 6 employ the same transmitter at the transmitting station with directional transmitters beamed along the appropriate streets and timed by the overall controller that schedules the light cycle. Each vehicle has the same 5 tuned RF receivers and a sonic receiver as well as 4 analog counters or integrators as previously described. The actual computation logic differs somewhat between the embodiments. However, as stated previously, the actual logic elements are the same for both embodiments.

It is believed that the above descriptions of both the preferred embodiment of FIG. 3 and the alternative embodiment of FIG. 6 clearly indicates and explains the operational concepts of the present invention as well as the obvious advantages relative to vehicular traffic control to be gained thereby. All of the functional and logical components shown in the figures are well known in the computer arts and while not specified could readily be embodied in either tube, standard semiconductor, or various stages of integrated circuit technologies.

While the preferred means for measuring the range or distance of the vehicle from a traffic control means is indicated as a combination RF and AF signal, it will be appreciated that other distance measuring schemes might be readily employed, such for example, as a plurality of small highly directional RF generators located at the base points from the traffic control means which again could be detected by specifically tuned receivers in the vehicle Receiver to give a reasonable approximation of distance.

While the invention has been particularly shown and described with reference to preferred embodiments thereof, it will be understood by those skilled in the art that the above cited and other changes in form and details may be made therein without departing from the spirit and scope of the invention.

What is claimed is:

1. A traffic pacing system for use with a roadway network including a traffic control means located to interrupt a stream of traffic traversing a roadway of said network and characterized by a green and a non-green phase, said system comprising:
   a transmitting station associated with said traffic control means and including,
   means for producing range information signals from which an approaching vehicle may determine its distance from said traffic control means,
   means for transmitting timing cycle information signals indicative of the instantaneous phase of said traffic control means and indicative of the complete green and non-green phases of said traffic control means timing cycle,
   receiver means adapting for mounting on a vehicle including means for receiving the signals from said transmitting means,
   means for determining the distance of the vehicle from said traffic control means,
   means for determining the time of arrival of said vehicle at said traffic control means based on its current velocity, and
   means operative in response to said last named means to indicate an optimum velocity relative to the current velocity of said vehicle which will allow said vehicle to reach the traffic control means during a green phase thereof.

2. A traffic pacing system as set forth in claim 1 wherein said means for providing range information signals comprises means for concurrently transmitting a first radio frequency and an audio frequency pulse to an approaching vehicle.

3. A traffic pacing system as set forth in claim 2 wherein said means for transmitting timing cycle information includes means for producing signals indicative of the time to the end of the closest green phase of said traffic control means, the total time of said green phase, and the total cycle time of said traffic control means including the green and non-green phases.

4. A traffic pacing system as set forth in claim 3 wherein said last named means includes means for transmitting said timing cycle information pulses as distinct and separate radio frequency pulses and said receiver means includes separate receivers tuned to said distinct and separate frequencies for receiving said transmitted pulses.

5. A traffic pacing system as set forth in claim 4 wherein the magnitude of the transmitted information is a function of the time displacement of the timing cycle radio frequency pulses relative to the first radio frequency range pulse.

6. A traffic pacing system as set forth in claim 5 including means located in said receiver means for producing an analog voltage proportional to the time displacement of a received first radio frequency pulse and a subsequently received radio frequency timing cycle pulse and which comprises a linear integrator including a constant current source and an RC network wherein the charging of said RC network is substantially linear with respect to time and including gate means actuable to start charging said RC network upon the receipt of said first radio frequency pulse and to open said charging path upon receipt of a second radio frequency timing cycle pulse.

7. A traffic pacing system as set forth in claim 6 wherein said transmitting station includes an additional radio frequency transmitter for transmitting a pulse indicative of the legal speed limit in the vicinity of said traffic control means.

8. A traffic pacing system as set forth in claim 2 wherein said receiver includes means for comparing the time of arrival of said first radio frequency pulse with said audio frequency range pulse and means for determining the range to said traffic control means based upon the difference in times of arrival, 9. A traffic pacing system as set forth in claim 8 wherein the means for determining the time of arrival of said vehicle at said traffic control means includes means for dividing the range by the current velocity of said vehicle.

10. A traffic pacing system as set forth in claim 9 wherein said receiver includes means for comparing the computed time of arrival of said vehicle at said traffic control means to determine if said vehicle will arrive during a current or one of successive green phases of said traffic control means and if said comparison is successful to indicate that the vehicle should maintain its current speed.

11. A traffic pacing system as set forth in claim 10 wherein said time comparison means comprises analog voltage comparators wherein a voltage representative of the computed time of arrival for said vehicle is compared respectfully with voltages representative of the various points of successive traffic control cycle points including the beginning of a green phase, the end of a green phase and the middle of a non-green phase.

12. A traffic pacing system as set forth in claim 11 wherein means are included in said receiver means for indicating that the vehicle must alter its speed if the computed time of arrival does not fall within a green phase of said traffic control means, said last named means including means for determining the midpoint of successive non-green phases of said traffic control means and means for indicating that the vehicle should speed up if its computed time of arrival falls within the non-green phase before said midpoint and for indicating that the vehicle should slow down if said time of arrival falls within said non-green phase after said midpoint.

13. A traffic pacing system as set forth in claim 12 including means for automatically comparing the computed time of arrival of said vehicle with the proper cycle of said traffic control means.

14. A traffic pacing system as set forth in claim 13 including means for comparing the legal velocity in the area of said traffic control means as transmitted by said transmitting station with the current velocity of the vehicle and for indicating that the driver must slow down if the current vehicle velocity exceeds the legal velocity wherein said last named indication overrides any other determinations of said system based on computed time of arrival.

References Cited

UNITED STATES PATENTS

| | | | |
|---|---|---|---|
| 2,255,055 | 9/1941 | Halstead | 340—32 |
| 3,094,682 | 6/1963 | Brosh et al. | 340—32 X |

JOHN W. CALDWELL, Primary Examiner

C. MARMELSTEIN, Assistant Examiner

U.S. Cl. X,R.

340—43; 343—101